(12) United States Patent
Rossi et al.

(10) Patent No.: US 8,643,953 B2
(45) Date of Patent: Feb. 4, 2014

(54) MANUFACTURING OPTICAL ELEMENTS

(75) Inventors: Markus Rossi, Jona (CH); Hartmut Rudmann, Jona (CH)

(73) Assignee: Heptagon Micro Optics Pte. Ltd., Singapore (SG)

(*) Notice: Subject to any disclaimer, the term of this patent is extended or adjusted under 35 U.S.C. 154(b) by 436 days.

(21) Appl. No.: 12/809,374

(22) PCT Filed: Dec. 16, 2008

(86) PCT No.: PCT/CH2008/000534
§ 371 (c)(1),
(2), (4) Date: Nov. 11, 2010

(87) PCT Pub. No.: WO2009/076790
PCT Pub. Date: Jun. 25, 2009

(65) Prior Publication Data
US 2011/0043923 A1     Feb. 24, 2011

Related U.S. Application Data

(60) Provisional application No. 61/014,811, filed on Dec. 19, 2007.

(51) Int. Cl.
*G02B 3/00*      (2006.01)
*G02B 27/10*     (2006.01)
*B29D 11/00*     (2006.01)
*C03B 11/08*     (2006.01)

(52) U.S. Cl.
USPC ............ 359/642; 359/619; 359/626; 264/1.1; 264/1.32; 65/37; 65/59.3; 65/66; 65/102; 65/269

(58) Field of Classification Search
USPC ............... 264/1.1, 1.32; 65/37, 59.3, 66, 102, 65/269; 359/619–628, 642
See application file for complete search history.

(56) References Cited

U.S. PATENT DOCUMENTS

| | | | |
|---|---|---|---|
| 1,466,973 A * | 9/1923 | Takanashi | .................. 65/66 |
| 3,532,038 A | 10/1970 | Rottmann | |
| 3,864,034 A | 2/1975 | Yevick | |
| 4,154,506 A | 5/1979 | Yevick | |
| 6,805,902 B1 | 10/2004 | Hayes | |
| 2005/0110104 A1 | 5/2005 | Boettiger et al. | |
| 2007/0141192 A1 | 6/2007 | Tsai | |

FOREIGN PATENT DOCUMENTS

| CN | 1982241 | 6/2007 |
|---|---|---|
| EP | 1 251 365 | 10/2002 |

(Continued)

OTHER PUBLICATIONS

Japanese Office action filed in Patent Application No. 2010-538309 mailed Aug. 20, 2013.

*Primary Examiner* — Evelyn A. Lester
(74) *Attorney, Agent, or Firm* — Rankin, Hill & Clark LLP

(57) ABSTRACT

A method of replicating at least one optical element is provided, the method including the steps of: providing a substrate with two large sides and at least one pre-defined replication site defined by a through hole or blind holes at corresponding locations on both large sides of the substrate; and adding, by replication, a replicated structure to the substrate, the replicated structure adhering to the substrate and having, at the replication site, replication material in the through hole or in the two blind holes, respectively and a first replicated surface and a second replicated surface, the first and second replication surfaces facing towards opposite sides.

16 Claims, 8 Drawing Sheets

(56) References Cited

FOREIGN PATENT DOCUMENTS

| JP | S5341238 | 4/1978 |
|---|---|---|
| JP | 55-090909 | 7/1980 |
| JP | 01-107204 | 4/1989 |
| JP | 04-326301 | 11/1992 |
| JP | 06-317701 | 11/1994 |
| JP | 2005-148430 | 6/2005 |
| WO | 2004/068198 | 8/2004 |
| WO | 2005083789 | 9/2005 |

* cited by examiner

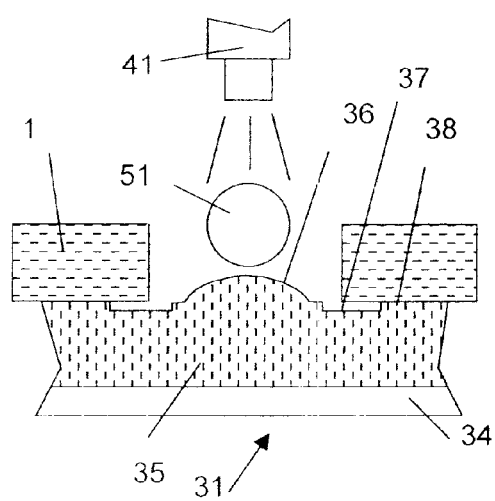
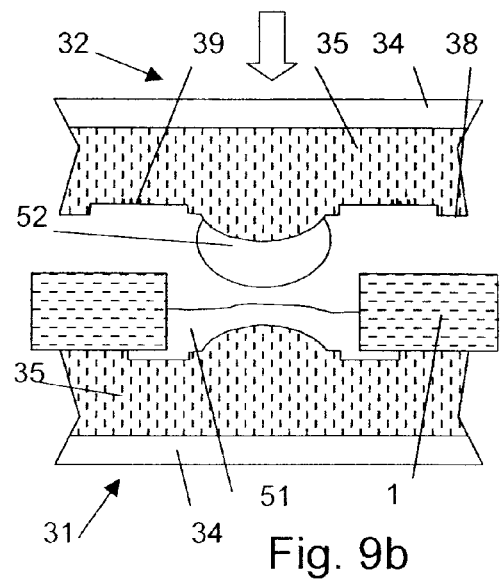
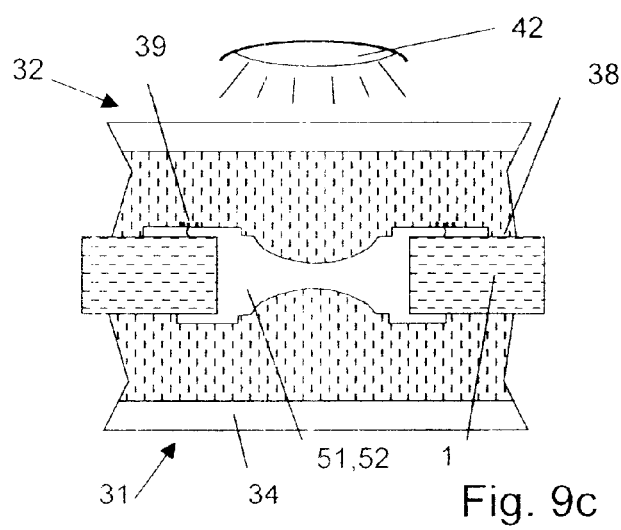

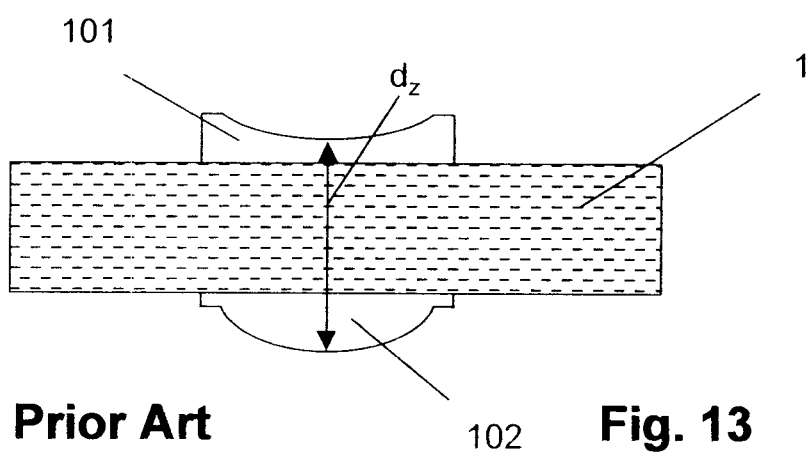
Prior Art     Fig. 13

MANUFACTURING OPTICAL ELEMENTS

BACKGROUND OF THE INVENTION

1. Field of the Invention

The invention is in the field of manufacturing a plurality of optical elements, for example refractive optical lenses or diffractive micro-optical lenses, preferably on a waver scale by means of a replication process that includes embossing steps. More concretely, it deals with a method of replicating a plurality of optical elements.

2. Description of Related Art

Replicated optical elements include transparent diffractive and/or refractive optical elements for influencing an optical beam in any pre-defined manner, refractive elements such as lenses, potentially at least partially reflecting elements etc.

When optical elements are produced by replication, there is often a basic configuration involving a substrate and a replication tool, and replication material being placed in contact with the substrate and/or the replication tool. The replication tool comprises a replication structure being the negative of a surface structure of the element(s) to be replicated. In the course of a replication process, the replication material is hardened, and thereafter the replication tool is removed, the replication material remaining in contact with the substrate.

Of special interest are the wafer-scale fabrication processes, where an array of optical elements is fabricated on a large-scale, for example disk-like ("wafer-") structure, which subsequently to replication is separated ("diced") into the individual elements or stacked on other wafer-like elements and after stacking separated into the individual elements, as, for example, described in WO 2005/083 789. 'Wafer scale' refers to the size of disk like or plate like substrates of sizes comparable to semiconductor wafers, such as disks having diameters between 2 in and 12 in.

In the following text, the substrate is sometimes referred to as "wafer". This is not to be interpreted in being limiting in terms of size or shape of the substrate, rather, the term denotes any substrate suitable for an array of optical elements that are, at some stage subsequent to the replication process, diced into a plurality of components.

Often, optical elements manufactured by a replication process include replicated structures on both sides of a wafer, the two sides together, for example, constituting a lens with two surfaces. Such a lens can have two concave surfaces, two convex surfaces, a concave and a convex surface, mixed convex/concave structure on at least one surface, diffractive structures on at least one surface etc.

In many optical systems, the track length (the path of the light travelling through the lens) is a key parameter for lens design. However, the fabrication of a lens on two sides of a wafer scale substrate has some limitations:

- The substrate thickness needs to have a minimum thickness in order to provide the required mechanical stability, typically of 400µ or greater;
- For cost reasons, the substrates are often chosen to be off-the-shelf items with a standard thickness. The range of available standard thicknesses is constrained, and this constriction leads to limitations in the optical design.

An example of a convex-concave lens according to the state of the art is depicted in FIG. 13. The lens is made up of two replicated (partial) elements 101, 102 on both sides of a transparent substrate 1, for example a glass plate. The thickness $d_z$ in the normal direction z to the substrate surface is an important design parameter, and designers would like to be able to vary the parameters. According to the depicted state of the art solution, this was not possible.

BRIEF SUMMARY OF THE INVENTION

It is an object of the invention to provide a method for replicating a plurality of optical elements (i.e. wafer scale replication) without the design constraints regarding prior art approaches. It is a further object of the invention to provide a method of replicating at least one optical element to be carried by a substrate, where the physical properties of the substrate have a reduced influence on the optical properties of the optical element.

According to a first aspect of the invention, a method of replicating a plurality of optical elements is provided, the method including the steps of:

providing a substrate with two large sides and a plurality of pre-defined replication sites defined by through holes or pairs of blind holes at corresponding locations on both large sides of the substrate;

adding, by replication, a replicated structure to the substrate, the replicated structure adhering to the substrate and comprising, at said replication sites, replication material in said through holes or in said pairs of blind holes, respectively and a first replicated surface and a second replicated surface, the first and second replication surfaces facing towards opposite sides.

The invention features the important advantage that there are no thickness constraints regarding the design of the optical elements, apart from the requirement that they in themselves have to be mechanically stable (which is not a strong constraint, as the lenses and especially potentially thin sections of them have very small lateral dimensions). In addition, in the case of through holes, the substrate does not need to have optical properties, as no light is passing through it. The substrate becomes uncritical in terms of material and surface quality (scratches etc.) and may, thus, be a lot less costly than prior art substrates. Also in a stack of different wafer-scale assemblies or of different optical elements, space may be saved and potentially the number of components may be reduced, since substrates could be stacked directly on top of each other, or spacers with reduced thickness may be used.

If the replication sites include a site defined by a through hole, the step of adding, by replication, a replicated structure may according to a first option comprise the sub-steps of moving a first replication tool comprising a first replication section and the first large side of the substrate towards each other, until the first replication tool and the substrate are in a pre-defined positional relationship, and with replication material in said hole and in contact with the first replication section;

hardening the replication material to provide hardened replication material adhering to the substrate;

moving a second replication tool comprising a second replication section and the second large side of the substrate towards each other, until the second replication tool and the substrate are in a pre-defined positional relationship, and with further replication material in contact with the second replication section and with the hardened replication material; and hardening the further replication material.

The "pre-defined positional relationship does not have to be exactly pre-defined in all dimensions. Rather, preferably, the z position (the position in the direction perpendicular to the large surfaces) is precisely defined, whereas the x-y position may optionally be defined only to the extent that the replication section is at a place within the replication site. However, the relative x-y positions of the first and second tool, or structures replicated by them, is preferably defined more accurately, and for example with an accuracy of a few µm or better.

According to a second option, the step of adding, by replication, a replicated structure may include the sub-steps of:
- moving a first replication tool comprising a first replication section and a second replication tool comprising a second replication section towards a first large side and a second large side, respectively, of the, until the first replication tool, the second replication tool, and the substrate are in a pre-defined positional relationship, and with replication material in said holes and in contact with the first replication section and with the second replication section; and
- hardening the replication material to provide hardened replication material adhering to the substrate.

Where the replication sites are defined by blind holes on opposite large sides of the substrate (i.e. no through holes are present), it is also possible to replicate in one step or in two steps. In contrast to the above-described method of replicating into through holes, however, the replication material will also in the case of one-step replication have to be provided in two separate portions, one for the first blind hole and the other one for the second blind hole.

Preferably, in all embodiments a plurality of optical elements is manufactured on a wafer scale, in a process comprising parallel process steps. In this, the substrate comprises a plurality of replication sites, and the tools comprise a plurality of replication sections.

In the following, the through holes or blind holes are sometimes referred to as "holes", any referral to a "hole" pertains to both, the "through hole" embodiments and the "blind hole" embodiments of the invention.

In any one of the mentioned embodiments of the invention, the replication tool may be chosen to comprise at least one of:
- a contact spacer portion at least partially surrounding or completely surrounding the replication section(s) and being suitable of resting against the substrate surface during replication, so that it forms a seal around the replication section for preventing a lateral (radial) flow of the replication material further than the spacer portion; and of
- one or a plurality of flow stoppers formed by an edge peripheral to the replication section(s) and suitable for confining the lateral flow of the replication material due to surface energy effects.

In either case, such a replication tool comprising contact spacer portion(s) and/or flow stoppers, is used in combination with dispensing the replication material at the individual replication sites, thus in at least one replication material portion per replication site, where the replication material portions of the different sites stay separate during the whole process. Depending on the application, this may feature substantial advantages over an approach where the replication material is dispensed over a large surface of the substrate. Also, it allows to help the contact spacers to help define the z-dimension of the final, replicated element also in the cases where the replication tool (and/or the substrate) is not dimensionally stiff enough to precisely define said thickness if the relative z-position of the substrate and the replication tool are fixed peripherally.

The contact spacer portions are preferably of a same material as a replication surface defining the replication section(s), thus are contiguous with the replication sections and manufactured together with them.

The contact spacer portions may according to the above, in addition to providing mechanical stability during replication and defining the z-dimension, also have the function of forming a seal preventing lateral flow. This is especially preferred for the and advantageous in the case the replication sites is defined by through holes. Then, preferably the first replication is brought into contact with the substrate from a first side, and the replication material (or a first portion thereof) is dispensed from a second, opposite side into the blind hole that results if the replication tool rests against the substrate and the contact spacer forms a seal somewhere around the first side rim of the through hole.

The second, replication tool, in contrast, then preferably contains a plurality of flow stoppers at different radial positions so that the amount of the replication material need not be defined as precisely as the z-dimension. The same holds for the (both) replication tools if the replication sides are not defined by through holes, but by pairs of blind holes on opposite sides. However, also the replication tool with the flow stoppers may—and preferably will—have contact spacer portions, the contact spacer portions being further outside from the flow stoppers.

In any one of the above-described embodiments, for the mechanical stability of the replicated element and its adhering to the substrate, a replicated base layer may be generated as a part of the replicated optical element structure, the base layer extending outwardly from the edge of the holes and thereby covering a section of the large side of the substrate.

To this end, the step of adding a replicated structure to the substrate includes adding the replicated structure with said base layer.

To do this, either the first replication tool or the second replication tool or—preferably—both, the first and the second replication tools may be provided with (a) base layer replication section(s) peripheral to the replication section(s) and for example surrounding them. The base layer replication section(s) defining the base layer. The lateral extension of the base layer may be defined by the replication tool, or the replication tool may comprise a plurality of flow stops providing a plurality of possible lateral base layer extension confinements, or the base layer extension may be left open by the tool and, thus, just be defined by the amount of replication material disposed.

The invention also concerns a wafer scale assembly of optical elements, for example manufactured by a method as described, the assembly comprising a substrate with a plurality of replication sites, each replication site defined by a through hole or blind holes at corresponding locations on both large sides of the substrate, the replicated structure adhering to the substrate and comprising, at said replication site, at least partially transparent replication material in said through hole or in said two blind holes, respectively and a first replicated surface and a second replicated surface, the first and second replication surfaces facing towards opposite sides.

Further, the invention also concerns an optical element, for example manufactured by a method as described and/or manufactured by dicing a wafer scale assembly into the individual optical elements, the optical element comprising a substrate portion with a replication site defined by a through hole or blind holes at corresponding locations on both large sides of the substrate portion, the replicated structure adhering to the substrate portion and comprising, at said replication site, at least partially transparent replication material in said through hole or in said two blind holes, respectively and a first replicated surface and a second replicated surface, the first and second replication surfaces facing towards opposite sides.

Throughout this text, the dimensions, directions and orientation sometimes referred to a Cartesian coordinate system that is also illustrated in some of the following figures. In this, the x-y-plane is defined by the large, overall flat sides of the replication tool and of the substrate. The z-direction is the direction perpendicular thereto. This definition of the coordinate system is used throughout this description and for all figures. For example, the z-dimension of a replicated structure always denotes the thickness of the replicated structure measured perpendicularly to the large surfaces of the substrate. The terms "lateral" and "radial" refer to directions in the x-y-plane (and may refer to an optical element axis or optical element center line), whereas "thickness" refers to the extension in z-direction.

The "sides" or "large sides" of the substrates are the essentially parallel surface portions of the substrate that usually make up a major fraction of its surface (for a disc-like substrate the top and bottom surfaces, for a rectangular substrate the largest surfaces, etc.)

The optical elements manufactured by the method according to the invention are preferably lenses, where a "lens" is to be interpreted as a transparent object with two surfaces (that are not parallel planes) through which the light (this includes non-visible electromagnetic radiation such as IR and possibly UV light) passes and, depending on the angle of incidence, a direction is influenced. A lens in this sense may be a classical lens with axial symmetry (the symmetry axis corresponding to the z-axis of the coordinate system) but also another lens that deviates from such axial symmetry.

BRIEF DESCRIPTION OF THE DRAWINGS

Principles of the invention as well as embodiments thereof will be explained in more detail in the following text with reference to the attached drawings. In the drawings, same reference numerals denote same or analogous elements. The drawings are all schematic and not to scale. They show:

FIGS. 9a-9c another embodiment of a method according to the invention;

FIG. 13 a lens according to the state of the art.

DESCRIPTION OF THE PREFERRED EMBODIMENTS

Figure 1:
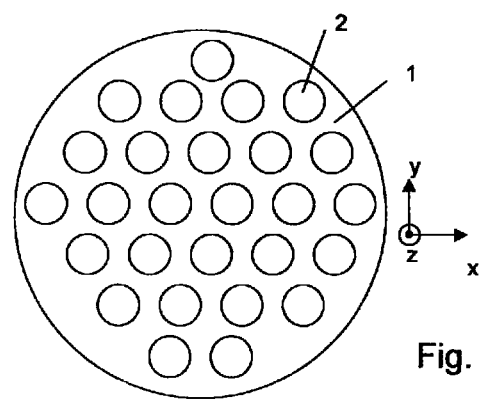
FIG. 1 a view of a substrate.

The substrate 1 schematically depicted in FIG. 1 is essentially flat with a plurality of replication sites defined by holes 2 in the substrate. Preferably, the substrate is wafer-scale. The arrangement of the holes on a large surface may be in a regular pattern to ease subsequent process steps such as dicing (dividing the optical assembly after replication, and potentially after further method steps such as stacking with other wafer-scale elements, into the individual elements).

The substrate used for the different embodiments of the invention may be transparent. It may be made of glass or of an organic or inorganic plastic material or of any suitable transparent material providing sufficient dimensional stiffness.

The substrate, according to an alternative, may be non-transparent. Especially, the substrate, if the replication sites are defined by through holes, may even be nontransparent in case the manufactured optical elements are lenses. A non-transparent substrate may be of any one of the above-mentioned materials, with an added dye and/or coating or other admixture rendering it nontransparent, or it may be of an intrinsically nontransparent material like a semiconductor material (the substrate may for example be a scrap silicon wafer), a metal, an intransparent metal oxide, a ceramics etc. More in general, it may be made of any material providing sufficient dimensional stiffness.

The holes (through holes or blind holes) may have a circular cross section, as depicted, but they may also have other shapes, including elliptical, rectangular (for example with rounded corners) etc. The shape is preferably well-defined but this is not necessarily the case. In case of blind holes, also the depth of the holes is preferably well-defined.

Figure 2:
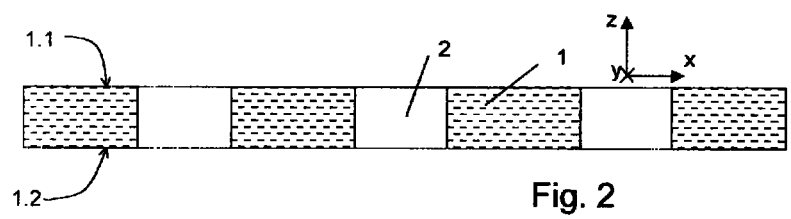
FIG. 2 a cross section of a substrate.

FIG. 2 shows a schematic cross section through a substrate 1 with through holes 2. Also illustrated are a first (large) side 1.1 of the substrate, and a second (large) side of the substrate, where in the orientation illustrated in FIG. 2, the first side corresponds to the upper side and the second side to the lower side. In the following description, the terms "first side surface" or "upper" surface and "second side surface" or "lower surface" of the replicated optical element denote surfaces that are, in the final product, in physical continuity with the upper and lower surfaces of the substrate, respectively, and essentially face in the same direction as the latter. The terms are not to be interpreted to refer to the shape of the surfaces in any way.

In FIGS. 1 and 2, also a coordinate system is shown. It corresponds to the above definition and also pertains to the following figures.

In the following figures, variants of optical elements (lenses) and variants of a method of manufacturing at least one optical element are illustrated. The figures show (the manufacturing of) one lens only, however, a preferred variant to all illustrated embodiments is wafer-scale fabrication, in which the substrate comprises a plurality of replication sites, and the replication tools comprise a plurality of corresponding replication sections. The illustration of the substrate and the tools in the following figures, therefore, are meant to be considered to show only a section of the substrate/tool, only, the shown structures being repeated for every one of the plurality of replication sites.

Figure 3:
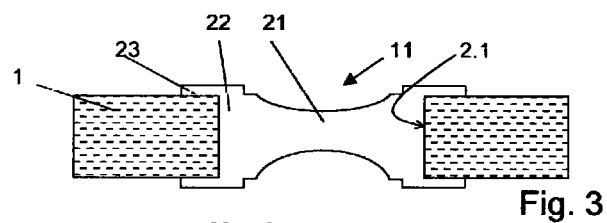
FIGS. 3-6 cross sections of different embodiments of a lens fabricated in accordance with a method of the invention.
Figure 4:
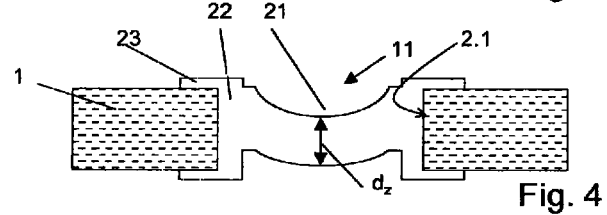
Figure 5:
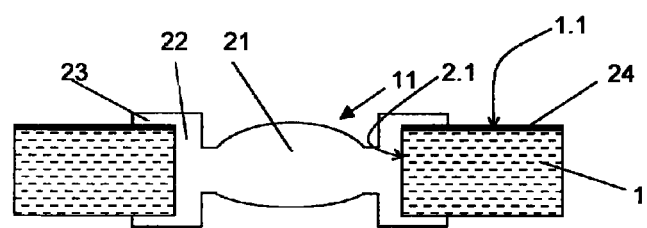

FIGS. 3-5 show, as examples, principles of lenses 11 that can be manufactured by methods according to the invention, namely a biconvex lens (FIG. 3), a concave-convex lens (FIG. 4), and a biconcave lens (FIG. 5).

The illustrated optical elements are refractive lenses with an axial symmetry. In a central portion 21 around the lens axis, a first and a second surface form the refractive surfaces in accordance with the desired optical functionality. As becomes clear from the figures, due to the concept of the invention, there are no optical element thickness constraints. In particular, the central portion can comprise almost arbitrarily thin portions, so that very thin lenses are possible.

In the illustrated embodiments, a peripheral portion 22 is chosen to extend along an entire circumferential surface 2.1 of the hole, for reasons of mechanical stability. However, in case the mechanical stability provided by the adhesion of the hardened replication material to the substrate material (at the circumferential surface of the hole) is not sufficient to hold the optical element, a base layer 23 can be provided at the edge of the spacer hole 2. The base layer 23 provides the additional advantage of being suitable as an overflow channel during the replication process in case the amount of replication material can not be defined in sufficient accuracy, as will be explained in more detail further below.

As is nicely illustrated for example in FIG. 4, the thickness parameter $d_z$ compared to the prior art solution (FIG. 13) can be, depending on the lens design, much smaller than or approximately equal to the prior art magnitudes, said thickness due to the approach of the invention, being an almost freely choosable design parameter.

Yet another feature and advantage of embodiments of the invention is depicted in FIG. 5. Often, optical elements comprise constituents such as apertures or baffles. An aperture 24 is depicted in FIG. 5; however, an according aperture may also be provided in the other embodiments of the invention. Also other screening structures may be provided in an analogous manner for any one of the embodiments of the invention, for example a baffle comprising two aperture-like layers on both sides of the substrate 1.

An aperture 24 (or a layer of a baffle) may be provided as a layer substantially covering an entire upper surface 1.1. Therefore, no sophisticated alignment process is required for the aperture layer. In fact, the manufacturing of the substrate with the aperture being a flat structure may be almost completely de-coupled from the replication process.

A further advantage is that the aperture layer is in a better positional relationship to the lens surface regarding the z-position (it is not, as in prior art approaches, directly underneath the replicated material portion).

An aperture or a baffle is not required if the substrate 1 (spacer wafer) is light absorbing.

Figure 6:
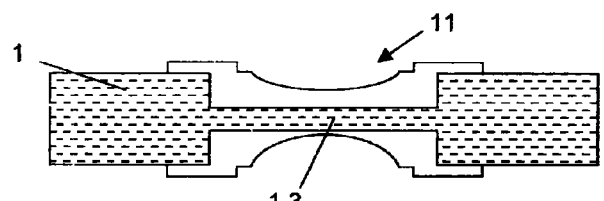

The method according to the invention is, of course, not restricted to the illustrated embodiments, but may be used for any kind of at least transparent optical elements. Variants include but are not limited to:
  micro-optical refractive and/or diffractive structures in addition or as an alternative to the curved surfaces forming the refractive lenses;
  Combined convex/concave structures on one or on both sides;
  asymmetrical arrangements;
  arrangements without any base layer 23, with just one base layer, and/or with at least one base layer not surrounding the entire periphery (but for example only—comprising bar-like protrusions at defined circumferential positions);
  holes in other than circular shapes; the outer rim does not even need to be well-defined;
  holes that are not through holes but that include a blind hole in each side of the substrate, at corresponding lateral positions, as illustrated in FIG. 6; in this, the substrate at least at the position of the bridge portion 1.3 remaining between the holes, is transparent;
  combinations of the above.

The skilled person will realize that the methods described in the following will pertain to all the variants as well, with appropriate modifications of the replication tool. Only the embodiment of FIG. 6 and variants thereof require a somewhat different approach regarding the sequence of method steps during replication; this is addressed explicitly in the following.

In the following figures, variants of method of manufacturing at least one optical element are illustrated. All of these variants, are preferably carried out on a wafer scale. The illustrated dispensing steps (where replication material is dispensed for each replication site individually), will, on a wafer scale, preferably be serial processes, where a dispensing unit or several dispensing units is/are—guided over a surface of the tool/substrate and droplets are dispensed, at the desired locations, not unlike an inkjet printer. Concerning the application of a plurality of portions and the advantages thereto, the reader is referred to WO 2007/107027 incorporated herein by reference. The dispensing step may, as an alternative, also be a parallel step, and may for example include dipping a large scale tool into a receptacle with the replication material droplets of which then adhere to portions of the tool. As a further example of a parallel dispensing step, the replication material may be dispensed on a large area over a large fraction of the entire substrate and/or tool.

All other steps, including the hardening steps, are preferably carried out in parallel on a wafer scale.

Usually, the number of replication sites on the substrate will be equal to the number of replication sections on the replication tools, however, special cases can be envisaged where, for example, not all replication sites are used and consequently not for all replication sites a corresponding replication section is present in the tool. Also, there might be cases where the tool in addition to the replication sections for the pre-defined replication sites comprises further replication sections for a flat, not pre-structured portion of the substrate. These special cases are not gone into in the following.

FIGS. 7a through 7f illustrate method steps of a first embodiment of a method according to the invention, the method being suitable for a substrate with a through hole 2. In a first step (FIG. 7a), a first replication tool 31 is placed in well-defined position relative to the substrate 1.

The replication tool 31—this pertains to all embodiments—may comprise a rigid backplate 34 and a softer material portion 35. The softer material portion forms the replication sections 36 and potential spacer portions.

In the illustrated embodiments—this is a preferred feature for all embodiments—the tool 31 comprises contact spacer portions 38 that are operable to rest against the substrate 1 during replication, with no material between the contact spacer portions and the substrate. The contact spacer portions may be contiguous or may comprise a plurality of discrete portions around the periphery or distributed over a large portion of the periphery and/or an interior of the replication surface. According to a preferred embodiment, the contact spacer portions and the floating spacer portions (if any) are arranged and configured such that if the tool lies on the substrate, the thickness (the z-dimension, i.e. the dimension perpendicular to the substrate and tool plane) is defined by the spacer portions, as taught in WO 2004/068 198 and WO 2007/107026, both incorporated herein by reference.

The softer material portion 35 may be made of a material with comparably low stiffness, so that the material is deformable on a small scale to adapt its shape to surface structures of the object, against which it rests, such as sub-micrometer-scale surface roughnesses. Said material may, in addition, have a comparably low surface energy to make such adaptation energetically attractive. By this, protruding contact spacer portions 38 adhere to the substrate and may thus form a seal for preventing lateral flow of the replication material and effectively form a lateral flow-stop. A preferred example of such a material is polydimethylsiloxane PDMS. This material is also well suited for a replication tool forming process, as described in WO 2004/068 198, there referring to FIGS. 14-16, incorporated herein by reference.

Instead of or in addition to the contact spacer 38 forming a lateral flow stop, other flow stop means may be used to laterally confine the flow of replication material, including choosing materials with appropriate surface properties causing the replication material to avoid locations like thin gaps (for example because of the replication material having a high surface tension), and including flow stops formed by edges or the like, as mentioned further below in this text.

Figures 7A, 7B:
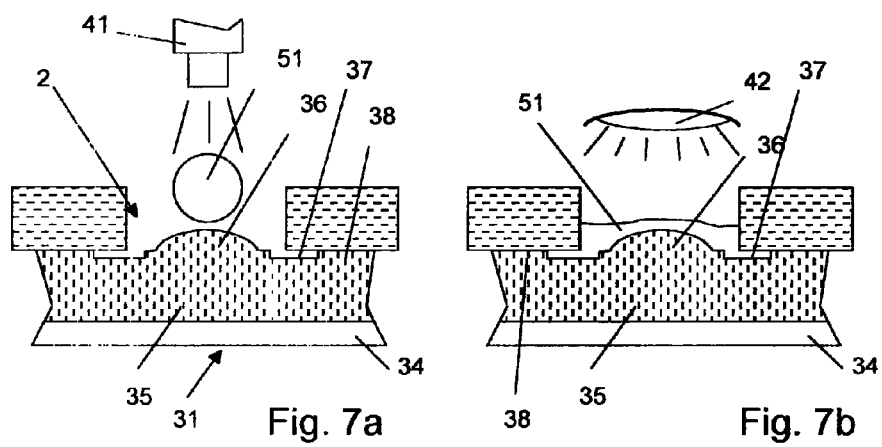
FIGS. 7a-7f method steps in an embodiment of a method according to the invention.

FIG. 7a further shows a dispensing tool 41 for dispensing individual first portions of replication material 51. The replication material may be any suitable material that can be hardened and that after hardening is at least partially transparent to form the optical element. Also mixtures and/or portions of different replication materials may be used. One class of suitable materials are UV curable epoxy resins.

In the shown configuration, the contact spacer portions 38 are chosen to surround the replication sections and a peripheral base layer replication section 37 and to laterally confine the flow of replication material towards all directions (FIG. 7b).

The method step illustrated in FIG. 7b includes irradiating the replication material with energy. In FIG. 7b, an according energy source 42, such as a UV lamp, is shown.

Whereas in FIG. 7b the UV lamp is shown to be on the other side of the substrate as the first replication tool, this need not be the case. Rather, for replication tools transparent for the chosen energy radiation (such as UV light), the illumination may also be carried out through the tool.

The hardening step may include different sub-steps, such as the sub-step of irradiating the replication material and the further sub-step of waiting until the replication material has reached its final consistency. Under certain circumstances, the second or later sub-steps of the hardening process may take place after removal oft the first replication tool.

After the first portion 51 of replication material has hardened, the first replication tool is removed, and a further, second portion 52 of replication material is dispensed. Thereafter, a second replication tool and the substrate 1 are moved against each other until the second replication tool 32 and the substrate are in a well-defined positional relationship. In the illustrated embodiment, also the second replication tool 32 comprises contact spacers that rest against the substrate 1 surface to define the positional relationship. In a region between the replication section 36 and the contact spacer portions, the replication tool may further comprise flow confining features 39 around the replication sections, for example as described in WO 2007/107025, incorporated herein by reference. These flow confining features are advantageous in case it would be difficult to exactly define the amount of replication material and capillary forces would otherwise tend to draw the replication material out of a central region towards the periphery and the contact spacer portions 38.

Figure 7C:
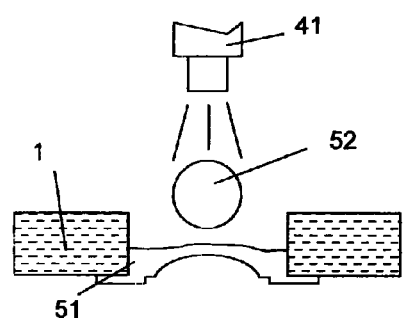
Figure 7D:
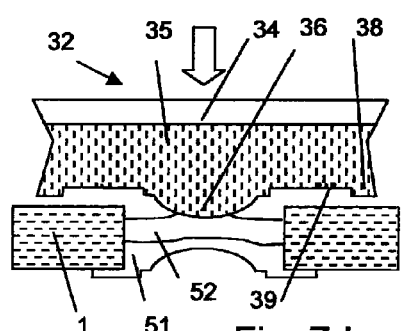
Figure 7E:
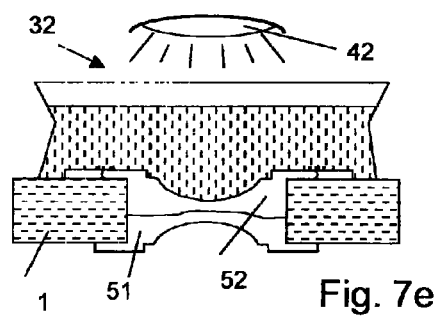
Figure 7F:
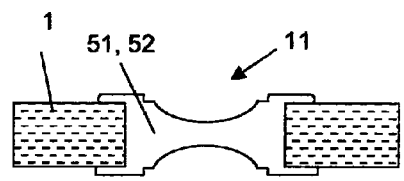

FIG. 7e depicts the configuration in which the second replication material portion 52 is hardened. FIG. 7e shows the lens 11 after hardening. At least if the first and second replication material portions are of a same material, the boundary between the first and second portions of replication material is not visible any more.

Figure 8:
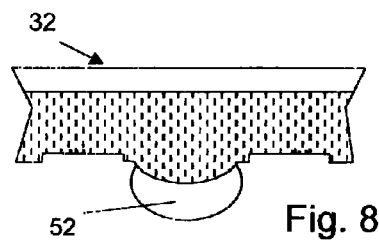
FIG. 8 a variant of a step of the method of FIGS. 7a-7f.
Figure 10A:
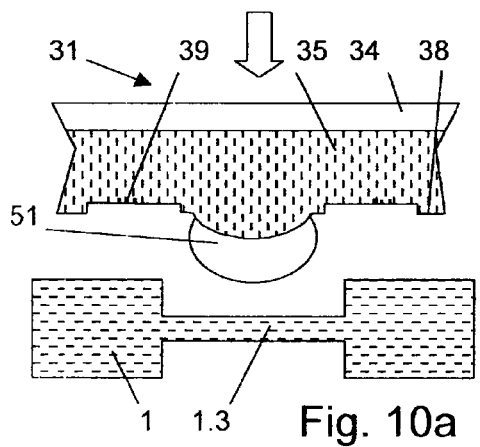
FIGS. 10a-10d method steps in an embodiment of a method according to the invention, where the substrate contains blind holes.
Figure 10B:
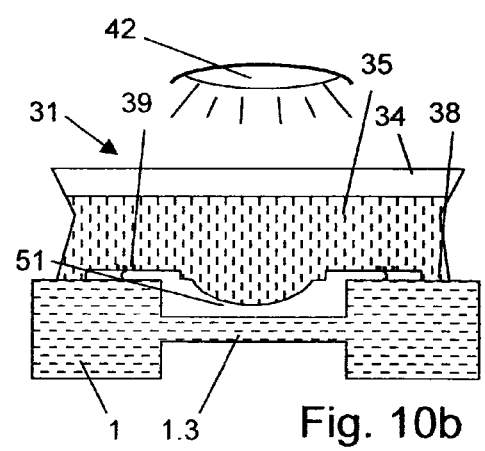
Figure 10C:
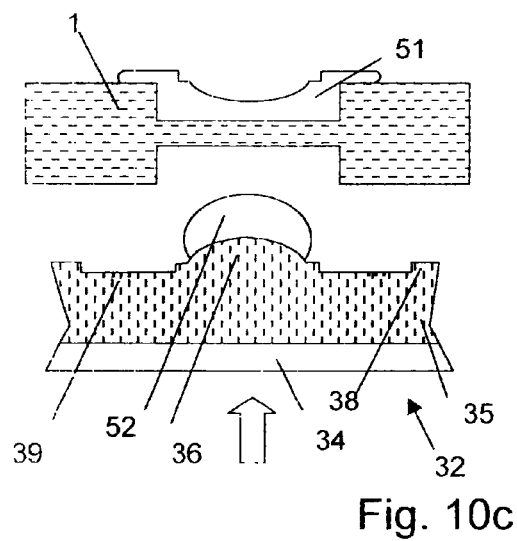
Figure 10D:
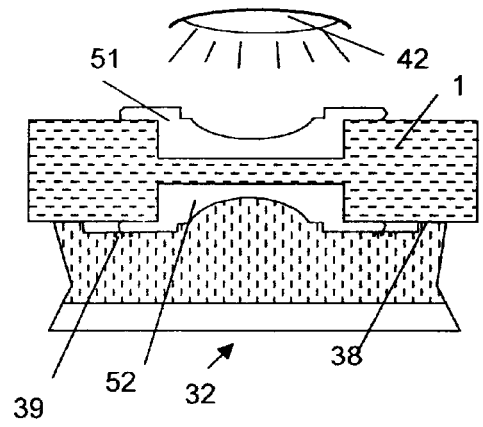

Whereas FIG. 7c illustrates dispensing the second replication material portion 52 into the hole 2 (or what remains thereof after hardening of the first replication material portion 51), in addition or as an alternative, replication material for the second portion could also be dispensed on the second replication tool 32, as illustrated in FIG. 8. Especially for convex lenses or lenses with convex portions dispensing in the tool (only or in addition to dispensing on the substrate) has proven to provide advantageous results in terms of quality.

Referring to FIGS. 9a to 9c, an alternative embodiment of manufacturing, by replication, at least one optical element in a substrate with a through hole 2 as replication site is described. This alternative embodiment features replicating the optical element with two tools, defining the first side surface and the second side surface of the optical element, where the two tools are simultaneously present with the initially liquid or viscous or plastically deformable replication material between them, which replication material is then hardened.

A first step (FIG. 9a) may substantially be carried out like the step described referring to FIG. 7a. Thereafter, the first replication material portion 51 is not hardened, but the second replication tool 32 and the second replication material portion 52 are placed (FIG. 9b), so that the first and second replication material portions flow into each other and form a common optical element replication portion 51, 52 (FIG. 9c). Thus, the whole optical element is replicated in one step.

In FIGS. 9a-9c the first replication tool 31 is, like in the above-described embodiment, illustrated with the contact spacer portion 38 in an arrangement surrounding the replication section 36 relatively closely, whereas the contact spacer portion 38 of the second replication tool 32 is further outside, and further flow stop means 39 are arranged between the replication section 36 and the contact spacer portion. If the further flow stop means include a plurality of flow stops for accommodating different amounts of material (like a plurality of concentric edges or the like), all dimensions of the optical element may be will defined even if the amount of replication material is not precisely known.

The illustrated arrangement is not the only possible embodiment.

Instead, for example, the arrangement may be reversed, or both replication tools 31, 32 could have features like the second replication tool. If the dispensing step is precise, both replication tools could be formed like the first replication tool, or one or both of the tools could have other flow stopping means.

As yet another alternative, pertaining to all embodiments of the invention, on one side or even on both sides, the substrate may comprise flow stopping means, instead of or in addition to the tool. Flow stopping means may also be constituted by regions of different surface properties, for example ring shaped coatings surrounding the holes on the substrate. Finally, also pertaining to all embodiments of the invention and depending on the material properties of the replication material and on the surface properties of the chosen substrate and replication tool, no physical flow stopping means on the tool and/or the substrate may be required.

A variation of the embodiment described referring to FIGS. 9a-9c, the dispensing may be carried out in substantially one step, either on the first tool while the tool rests against the substrate surface, or possibly on the second tool, or, if the geometrical boundary conditions allow so, even on the first tool prior to its approaching the surface.

Now referring to FIGS. 10a through 10d a method of manufacturing an optical element or a plurality of optical elements by replication is shown for the case where the substrate comprises replication sites defined by pairs of blind holes on either (large) side of the substrate. The method is analogous to the method described in FIGS. 7a-7f and FIG. 8, and only the differences are mentioned in the following.

In the shown configuration, dispensing of both, the first and the second replication material portion 51, 52 are dispensed on the first and second replication tool 31, 32, respectively. However, instead one or both portions could be dispensed into the blind holes, or dispensed as two sub-portions, one in the blind hole and the other one in the respective tool; arbitrary combinations are possible.

As the amount of both replication material portions 51, 52 (and not only the sum of both amounts) has an influence on a spread of the replicated elements, both, the first and the second replication tool 31, 32 are of the above-referenced kind with spacer portion 38 far outside and a plurality flow stoppers 39 at different positions.

Instead of the illustrated two-step procedure where the first replication material portion is hardened and the first replication tool 31 removed before the second replication tool is brought into position, also a one-step procedure (analogous to the sequence of method steps illustrated in FIGS. 9a-9c) could be chosen, where both replication tools are brought into position, and the first and second replication material portions 51, 52 are hardened at once.

In all of the above-described embodiments, the first side replicated structure has to be aligned with the second side, replicated structure. Depending on the shape of the holes in the substrate that define the replication site, also alignment to the substrate may be required (in most embodiments, though, an approximate alignment may be sufficient, since the walls of the openings are peripheral enough so that the exact positional relationship to the replicated features does not have an influence on the desired optical properties of the element.)

For aligning, the substrate may be provided with wafer-level alignment marks. These may, for example, be provided, prior to replication, on the wafer, for example by lithographic techniques. As an alternative, they may be provided by replication from the first replication tool which then has to have a replicatable feature. The second replication tool then, for example, has according marks to be aligned with the replicated alignment structure from the first replication tool. As yet another alternative, in the embodiment where the two replication tools are present and in a well-defined positional relationship with the substrate simultaneously when replicating, the two replication tools may be aligned, by means of wafer-scale alignment marks, to each other only. The positional relationship to the substrate is well-defined in that the relative z-position and the relative x-y position is approximately defined so that the replication sections are aligned with the replication sites, but the latter alignment does not need to be as precise as the alignment of the replicated surfaces to each other.

The step of moving the second replication tool and the substrate against each other, therefore, preferably in all embodiments includes the sub-step of aligning the second replication tool with the first replication tool or with a structure replicated from the first replication tool, respectively, prior to causing the contact spacers to rest against the substrate. If the second replication tool does not comprise any contact spacer, the sub-step of x-y-aligning may also be finished after the second replication tool has reached its z position, for example if the second replication tool comprises non-contact spacers resting against a thin film of replication material that then may cover a large fraction of the substrate surface.

The sub-step of aligning may be carried out in any suitable manner for example known in the art, including aligning by means of a mask aligner (or similar tool) using alignment marks in the substrate and/or the tool. Also aligning by mechanical means (self aligning structures), or aligning using image processing techniques etc. is possible.

Figure 11:
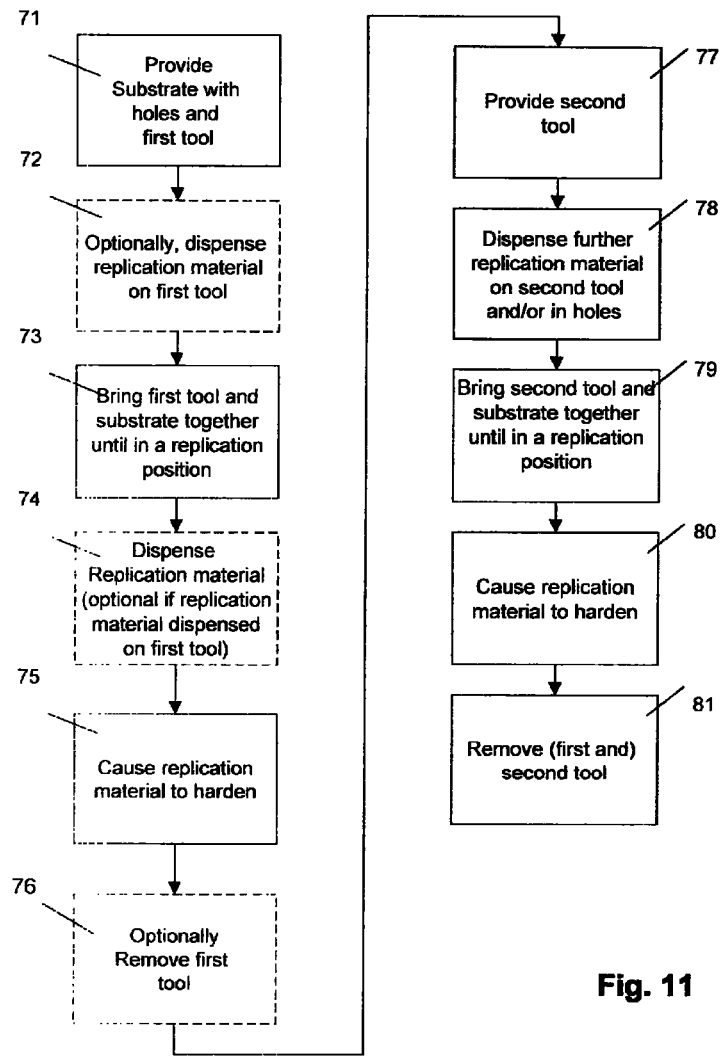
FIGS. 11, 12 flowcharts of embodiments of a method according to the invention.
Figure 12:
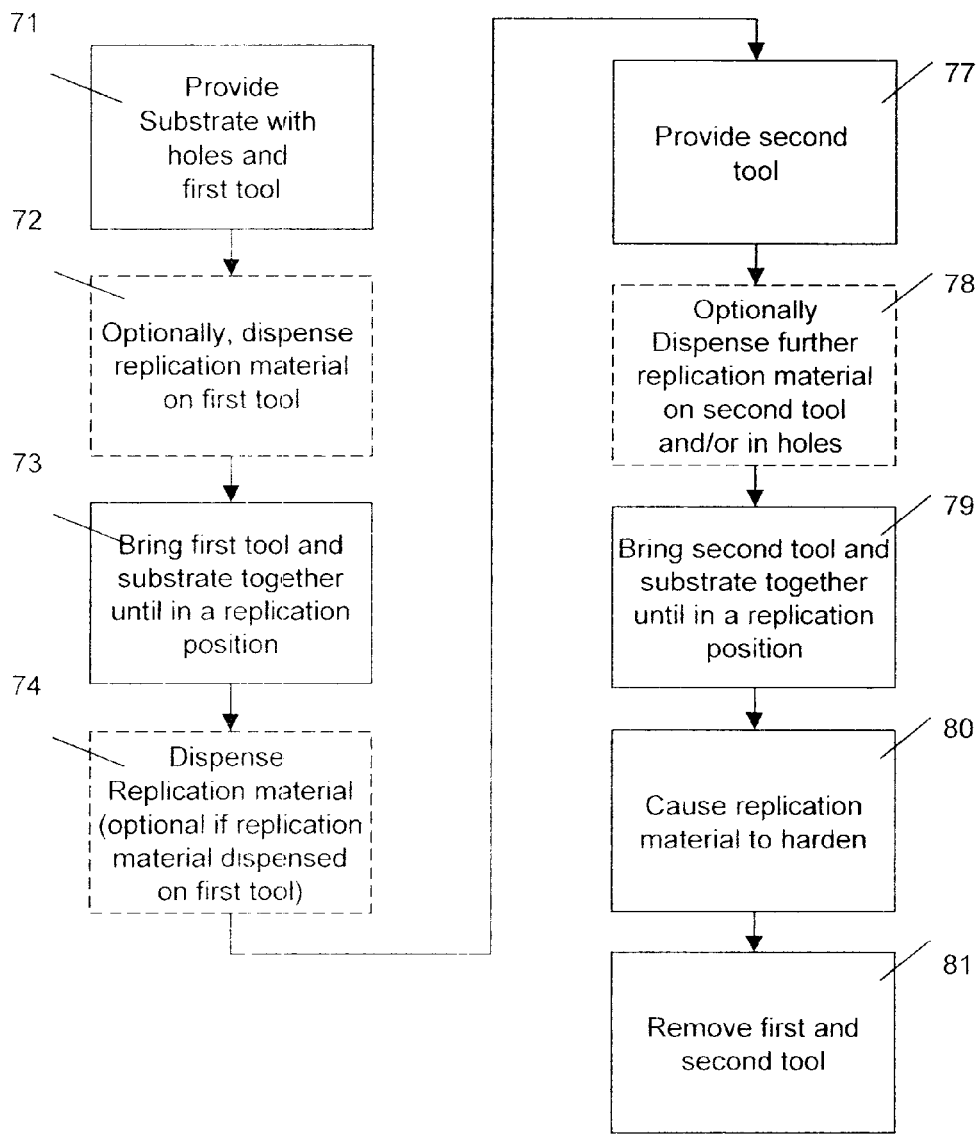

FIGS. 11 and 12, finally, show flowcharts of methods according to the invention. FIG. 11 refers to the situation where a first portion of replication material is hardened before a second portion is dispensed and comprises the steps of providing a substrate with holes and a first tool (71), optionally dispensing replication material on the first tool (72); this dispensing step, for example, including dispensing the individual portions in each replication section, the replication section, for example, defining a cavity surrounded by the contact spacer), bringing the first tool and the substrate together until a replication position is reached (in which the contact spacer portion(s), if present, rests against a substrate surface; 73), dispensing replication on the resulting assembly (if the holes are through holes, the dispensing preferably takes place into the blind hole that results if the first tool is in contact with a first side of the substrate) (74), causing the replication material to harden (75). The further steps include removing the first tool after hardening (76); this step may in principle also be carried out at a later time and is therefore denoted optional in the figure), then providing a second tool (77) and dispensing the second portions of replication material into the remaining holes and/or on the tool (78); bringing, preferably in a manner aligned with the structures replicated by the first replication tool, the second tool and the substrate together and in a replication position (79); in which the contact spacer(s) rest against the second surface of the substrate), causing the second replication material portion to harden (80) and removing the second tool (81).

FIG. 12 refers to the situation where either just one portion of replication material is dispensed or both replication portions are hardened simultaneously. It is distinct from the situation of FIG. 12 in that the steps denoted 75 and 76 in FIG. 11 are not present. If the holes in the substrate are through holes, the replication material may optionally be dispensed in a single step (74) into the blind hole that results if the first tool is in contact with a first side of the substrate. If the replication material is dispensed in two steps (74, 78), the step of bringing the substrate and the second replication tool together causes the two replication material portions to flow into each other.

If the substrate initially comprises two blind holes, the two replication material portions remain separate.

In all embodiments, each dispensing step may optionally include several sub-steps in which droplets of replication material are dispensed to together form the replication material portion(s), the sub-steps may follow each other immediately, or other steps may be carried out between the sub-steps.

What is claimed is:

1. A method of replicating a plurality of optical elements, the method including the steps of:
   providing a substrate with a first and a second large side and a plurality of pre-defined replication sites defined by through holes or pairs of blind holes at corresponding locations on both large sides of the substrate; and
   adding, by replication, a replicated structure to the substrate, the replicated structure adhering to the substrate and comprising, at said replication sites, replication material in said through hole or in said two blind holes, respectively and a first replicated surface and a second replicated surface, the first and second replicated surfaces facing towards opposite sides, wherein the step of adding, by replication, a replicated structure to the substrate comprises moving a replication tool and the substrate towards each other with replication material on the replication tool and/or in the through hole or blind holes.

2. The method according to claim 1, wherein the substrate is chosen to comprise through holes defining the replication sites, and wherein the step of adding, by replication, a replicated structure comprises the sub-steps of:
   moving a first replication tool comprising first replication sections and the first large side towards each other, until the first replication tool and the substrate are in a pre-defined positional relationship, and with replication material in said holes and in contact with the first replication section;

hardening the replication material to provide hardened replication material adhering to the substrate;

moving a second replication tool comprising second replication sections and the second large side towards each other, until the second replication tool and the substrate are in a pre-defined positional relationship, and with further replication material in contact with the second replication sections and with the hardened replication material; and hardening the further replication material.

3. The method according to claim 2, wherein at least one of the first replication tool and of the second replication tool comprises a contact spacer portion, and wherein said contact spacer portion is caused to rest against a surface portion of the substrate after the replication tool with the contact spacer portion and the substrate have been brought into a pre-defined positional relationship.

4. The method according to claim 3, wherein a lateral flow of the replication material is caused to be stopped by said contact spacer portion, or one of said contact spacer portions, respectively.

5. The method according to claim 3, wherein the contact spacer portion is of a same material as a surface of the replication section.

6. The method according to claim 3, wherein the contact spacer portion surrounds the replication section.

7. The method according to claim 2, wherein at least one of the first and the second replication tools comprises a flow confining structure, and wherein a lateral flow of the replication material is caused to be stopped by said flow confining structure.

8. The method according to claim 7, wherein said flow confining structure comprises a plurality of flow stoppers for stopping the flow at different radial positions.

9. The method according to claim 1, wherein the substrate is chosen to comprise through holes defining the replication sites, and wherein the step of adding, by replication, a replicated structure comprises the sub-steps of:

moving a first replication tool comprising a plurality of first replication sections towards the first large side and a second replication tool comprising a plurality of second replication sections towards the second large side, until the first replication tool, the second replication tool, and the substrate are in a pre-defined positional relationship, and with replication material in said holes and in contact with the first replication sections and with the second replication sections; and hardening the replication material to provide hardened replication material adhering to the substrate.

10. The method according to claim 1, wherein the substrate is chosen to comprise a plurality of first blind holes on the first large side of the substrate and a plurality of second blind holes on the second large side of the substrate, at corresponding lateral locations, the first and second blind holes together defining the replication sites, and wherein the step of adding, by replication, a replicated structure comprises the sub-steps of:

moving a first replication tool comprising a plurality of first replication sections and the first large side towards each other, until the first replication tool and the substrate are in a pre-defined positional relationship, and with first replication material portions in the first blind holes and in contact with the first replication sections;

moving a second replication tool comprising a plurality of second replication sections and the second large side towards each other, until the second replication tool and the substrate are in a pre-defined positional relationship, and with second replication material portions in the second blind holes and in contact with the second replication sections; and hardening the replication material, wherein the step of hardening the replication material may be carried out at once or in two sub-steps, the first sub-step for hardening the first replication material portions and prior to moving the second replication tool and the second large side of the substrate towards each other.

11. The method according to claim 1, comprising the further step of dividing the substrate with the replicated structure into individual elements.

12. The method according to claim 11, wherein the step of deciding the substrate occurs after stacking with further elements.

13. A wafer scale assembly of optical elements, comprising:

a substrate with a plurality of replication sites, each replication site defined by a through hole or blind holes at corresponding locations on both large sides of the substrate, the replicated structure adhering to the substrate and comprising, at said replication sites, at least partially transparent replication material in said through hole or in said two blind holes, respectively and a first replicated, concave, convex or combined concave/convex lens surface and a second replicated, concave, convex, or combined concave/convex lens surface, the first and second replication surfaces facing towards opposite sides.

14. The wafer scale assembly according to claim 13 wherein at least some of the optical elements comprise a base layer extending outwardly from an edge of the holes and thereby covering a section of the large side of the substrate.

15. An optical element, comprising:

a substrate portion with a replication site defined by a through hole or blind holes at corresponding locations on both large sides of the substrate portion, the replicated structure adhering to the substrate portion and comprising, at said replication site, at least partially transparent replication material in said through hole or in said two blind holes, respectively and a first replicated, concave, convex, or combined concave/convex lens surface and a second replicated, concave, convex, or combined concave/convex lens surface, the first and second replication surfaces facing towards opposite sides.

16. The optical element of claim 15 comprising a base layer extending outwardly from an edge of the hole or one of the holes, and thereby covering a section of the large side of the substrate.

* * * * *